Jan. 16, 1945. W. A. RAY 2,367,524
FLUID CONTROL VALVE
Original Filed Oct. 2, 1939
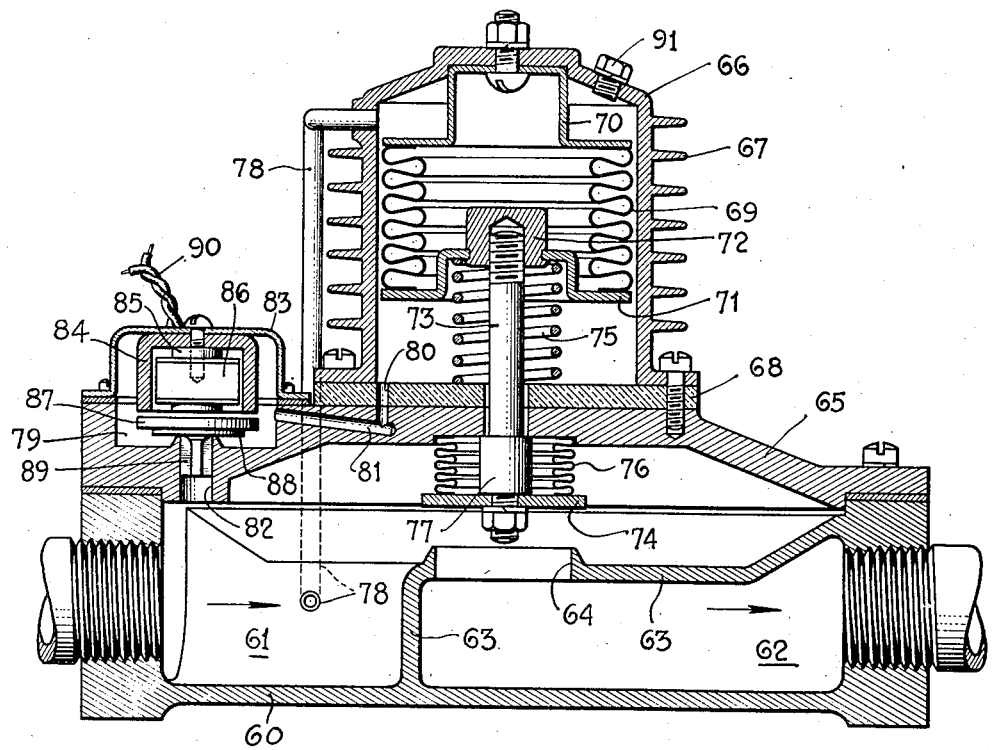
Inventor:
WILLIAM A. RAY,
By John H. Rouse
Attorney.

Patented Jan. 16, 1945

2,367,524

UNITED STATES PATENT OFFICE 2,367,524

FLUID CONTROL VALVE

William A. Ray, Los Angeles, Calif.

Original application October 2, 1939, Serial No. 297,490, now Patent No. 2,301,581, dated November 10, 1942. Divided and this application October 19, 1942, Serial No. 462,464

5 Claims. (Cl. 137—139)

This invention relates to fluid control valves, and more particularly to valves of the type suitable for controlling flow of vaporized liquids, such as steam. The present application is a division of my copending application, Serial No. 297,490, filed October 2, 1939, now Patent No. 2,301,581, dated November 10, 1942.

An object of the invention is to provide a simple and reliable thermally operated steam valve.

A more specific object is to provide a heat-motor-operated steam valve which can be effectively controlled by pilot valve means of the single open-closed position type.

Other objects and advantages of the invention will be found in the description, the drawing, and in the claims; and for full understanding of the invention, reference may be had to the following detailed description and accompanying drawing, the single figure of which is a vertical sectional view of a valve embodying my invention.

In the drawing, the numeral 60 indicates the lower section of a valve casing having an inlet 61 and an outlet 62 separated by a partition 63 which is provided with a main valve port 64; the upper section 65 of the casing being secured to the lower section and supporting an inverted cup-shaped metallic housing 66 which is provided with heat radiating fins 67. Interposed between the housing and the upper section of the valve casing is a relatively thick plate or disk 68, of thermal insulating material.

Within the housing is an expansible-contractible bellows member 69 which is sealingly secured at its upper end to a member 70 attached to the end wall of the housing, and at its lower end to a movable head member 71. A bushing 72, sealingly secured in a central opening through the movable member, carries a valve stem 73, at the lower end of which is a main closure member 74, cooperable with the main valve port 64. The bellows member is charged with a volatile fluid, such as acetone or ethyl alcohol, to form a conventional heat motor which operates, when heated, to move the main closure member downward, against the bias of spring 75, to close the main valve. Surrounding the lower end of the valve stem 73, and secured at its ends to the main closure and to the casing, is a bellows 76 which serves to seal the opening in the casing and in the disk 68 through which the stem extends. Upward movement of the closure is limited by an enlargement 77 of the lower portion of the valve stem.

Connecting the upper area of the housing with the valve inlet 61 is a pipe 78; and connecting the bottom of the housing with a recess 79, formed in the top surface of the upper casing section 65, are interconnecting passageways 80 and 81. A pilot valve port opening 82 connects the bottom of the recess 79 with inlet 61.

A cover member 83 for the recess 79 supports an electromagnet comprising a cup-shaped outer core 84, a cylindrical inner core 85, and an energizing coil 86. Arranged to be attracted by the electromagnet is an armature 87, to the underside of which is secured a closure member 88 and a fluted guide 89, each cooperable with the pilot valve port 82. Leads 90, sealingly extending through the top wall of the cover 83, are provided for connecting the coil 86 to a source of energy.

The operation of the valve will now be described in connection with the control of steam. Before connecting the valve in a steam conduit, the area within the housing 66 and surrounding the heat motor should be partly filled with water, a removable plug 91 being provided for that purpose. When the valve is then connected, the main closure member 74 being in open position, the steam will pass through the valve and will continue to do so while the electromagnet remains unenergized. When the magnet is energized, the armature 87 is attracted and the pilot closure member 88 lifted from its seat, thus permitting the water in housing 66 to pass by gravity into recess 79 and thence through port 82 into the main valve inlet 61. The water, in escaping, draws steam through pipe 78 into the housing and around the heat motor, both of which have been kept relatively cool by the insulating disk 68. As heat is lost by the steam within the housing, the resultant condensed water escapes through the open pilot valve, more steam taking its place. In a relatively short period of time (about 30 seconds, under average conditions) sufficient heat will thus be provided to the motor to effect closure of the main valve.

While the pilot valve remains open, as the steam surrounding the heat motor continues to condense, more steam takes its place, and the motor thus remains sufficiently heated to retain the main valve in closed condition. As is customary in steam lines, sufficient drainage should be provided so that the condensed water will not accumulate in the inlet of the valve.

When the electromagnet is deenergized, the pilot valve will close by gravity and escape of water from the housing thus prevented, with the result that the heat motor will gradually cool to effect opening of the main valve. Under average conditions, the interval between closing of the pilot valve and opening of the main valve will be about 3-5 minutes. When the pilot valve is reopened, escape of the condensed water from the housing will initiate the opening operation of the main valve as previously described.

While I have herein shown and described a specific embodiment of my invention, I wish it to be understood that modifications may be made without departing from the spirit of the invention, and that I intend therefore to be limited only by the scope of the appended claims.

I claim as my invention:

1. In a steam valve: a casing having an inlet and an outlet, a closure member for controlling passage of steam between said inlet and said outlet, means forming a chamber mounted above said casing, a heat motor in said chamber and operatively connected to said closure member, means forming a passageway connecting said chamber at one point with said inlet, and a pilot valve operable to connect said chamber at another point with said inlet, the arrangement being such that the closure member is closed when the pilot valve is open.

2. In a steam valve: a casing having an inlet and an outlet, a closure member for controlling passage of steam between said inlet and said outlet, means forming a chamber mounted above said casing, a heat motor in said chamber and operatively connected to said closure member, means forming a passageway permanently connecting the upper area of said chamber with said inlet, and a pilot valve operable to connect the lower area of said chamber with said inlet, the arrangement being such that the closure member is closed when the pilot valve is open.

3. In a steam valve: a casing having an inlet and an outlet, a closure member for controlling passage of steam between said inlet and said outlet, means forming a chamber and mounted on the top of said casing, a heat motor in said chamber, means operatively connecting said motor with said closure member and sealingly extending through the top wall of the casing, means forming a first passageway permanently connecting the upper area of said chamber with said inlet, means forming a second passageway connecting the lower area of said chamber with said inlet, and electrically operated pilot valve means controlling said second passageway, the arrangement being such that the closure member is closed when the pilot valve means is in passageway-opening condition.

4. In a steam valve: a casing having an inlet and an outlet, a closure member for controlling passage of steam between said inlet and said outlet, a housing mounted on the top of said casing and defining therewith a steam chamber, a heat motor mounted in said chamber and comprising a sealed expansible-contractible metallic bellows member charged with a volatile fluid, means operatively connecting said bellows member with said closure member and sealingly extending through the top wall of the casing, means forming a first passageway permanently connecting the upper area of said chamber with said inlet, means forming a second passageway connecting the bottom of said chamber with said inlet, and electrically operated pilot valve means for selectively opening and closing said second passageway, the arrangement being such that the closure member is closed when the pilot valve means is in passageway-opening condition.

5. In a steam valve: a casing having an inlet and an outlet, a closure member for controlling passage of steam between said inlet and said outlet, a plate of thermal insulating material mounted on the top of said casing, an inverted cup-shaped housing of good heat-conducting material mounted on said insulating plate and defining therewith a steam chamber, a heat motor mounted in the upper end of said chamber and comprising a sealed expansible-contractible metallic bellows member charged with a volatile fluid, means operatively connecting said bellows member with said closure member and sealingly extending through said plate and the top wall of said casing, means forming a first passageway permanently connecting the upper area of said chamber with said inlet, means forming a second passageway connecting the bottom of said chamber with said inlet, and electrically operated pilot valve means for selectively opening and closing said second passageway, the arrangement being such that the closure member is closed when the pilot valve means is in passageway-opening condition.

WILLIAM A. RAY.